United States Patent [19]

Ariniello et al.

[11] 4,426,750
[45] Jan. 24, 1984

[54] COMBINED REWIND FOOT/TAPE CLEANER

[75] Inventors: Robert M. Ariniello, Boulder; Stuart W. Bray, Louisville, both of Colo.

[73] Assignee: Storage Technology Corporation, Louisville, Colo.

[21] Appl. No.: 406,689

[22] Filed: Aug. 9, 1982

[51] Int. Cl.³ .......................... B08B 5/04; A47L 5/38
[52] U.S. Cl. ...................................... 15/308; 15/256.5
[58] Field of Search ................. 15/306 A, 308, 256.5; 352/130

[56] References Cited

U.S. PATENT DOCUMENTS

| | | | |
|---|---|---|---|
| 3,035,295 | 5/1962 | Buslik et al. | 15/308 X |
| 3,059,266 | 10/1962 | Cleveland | 15/308 |
| 3,683,445 | 8/1972 | Hagadorn | 15/308 |

*Primary Examiner*—Chris K. Moore
*Attorney, Agent, or Firm*—Ronald C. Williams

[57] ABSTRACT

Combined magnetic tape cleaner and rewind foot for cleaning foreign material from the oxide side of the tape during read/write operation and for lifting the tape away from the read/write head during rapid rewind. In the read/write mode, the cleaning screen located on the bottom side of the cleaning head loosen the foreign matter on the tape. This foreign matter is suctioned off and lifted from the tape through the holes in the screen, by means of negative pressure applied to the tape through a cavity in the cleaning head. In the rewind mode, the rewind foot, which is deposed around the cleaning head is rotated down into the tape path, lifting the tape off the cleaning head and away from the read/write head. The bearing surface of the rewind foot has a radial curve such that the rewind movement of the tape creates hydrodynamic pressure which lifts the tape off of the rewind foot. After rewind is complete, the rewind foot is rotated out of the tape path and the tape allowed to reengage the cleaning head and read/write head.

9 Claims, 4 Drawing Figures

COMBINED REWIND FOOT/TAPE CLEANER

BACKGROUND OF THE INVENTION

The present invention, a combined tape cleaner/rewind foot, relates to the field of cleaning the magnetizable surface of magnetic tape in a tape transport system and to the field of reducing wear on the tape and the read/write head during rewind operation, and in particular, to combining the two functions into a single, dual function unit.

In modern magnetic tape transport systems, the ability to store ever increasing amounts of digital data has been required. To accomplish this, decreased tape-read/write head separations have been needed. As this separation distance decreases, the problems associated with foreign matter on the tape surface has increased. In the prior art, small dust or oxide particles which would not have caused a read/write problem, will now cause significant errors as the separation distance between the head and the tape exceeds 2 microinches.

In the prior art, the tape has generally been cleaned by such methods as blowing a stream of compressed air across the tape surface, see e.g. U.S. Pat. No. 3,097,779 issued to Rock et al, or by scraping the material from the tape surface with a sharp edge and then lifting the material away from the tape, such as by trapping the particles in a porous material, see e.g. U.S. Pat. No. 3,975,789 issued to Derby et al, and U.S. Pat. No. 3,978,546 issued to Epina et al. However, new technology has generated much more delicate magnetic tapes so that use of the prior art cleaning methods would be ineffective in removing the smaller foreign matters and could severely wear and damage the sensitive recording materials. The present invention addresses this problem by providing a cleaning screen that gently loosens the foreign material and then removes the foreign material from the tape by use of negative pressure applied through the holes in the screen to the tape surface.

Another problem encountered in magnetic tape transport systems has been wear on both the read/write head and the tape itself during rewind operations. In modern tape transport systems, the tape can reach speeds of up to 500 inches per second during a rewind operation. If the tape were allowed to contact the read/write head during rapid rewind, in a relatively short time, both the head and the tape would be severely worn. The prior art has addressed this problem by establishing hydrostatic bearing surfaces using forced air to provide the air cushion upon which the tape floats during rewind. However, the prior art using this technique require positive pressure in the system in order to support the tape. These systems can be quite complex and are subject to a number of operational defects.

The present invention addresses this problem by using a tape foot which, when placed in the tape path as the rewind operation begins, lifts the tape away from both the cleaner screen and the read/write head. The tape foot is also a hydrodynamic bearing, using the aerodynamic shape of the tape foot surface to allow the air pressure between the tape and the tape foot to cause the tape to lift away from the tape foot and float on an air cushion as tape rewind speed is reached. An improvement over the prior art is also achieved in that special pressurization is not needed.

In addition, in magnetic tape transport systems, proper alignment of the tape as it passes over the read/write head is essential to proper system operation. The closer the tape guides can be placed to the read/write head, the more accurate will be the alignment. In the prior art, the tape cleaner and the rewind foot have been two seperate units. The present invention is an improvement over the prior art in that the tape cleaner and the rewind foot have been combined into a single unit. Thus, the space that in the prior art was occupied by two units is now occupied by a single cleaner/tape foot unit. This in turn allows the tape guides to be placed closer to the read/write head, thus providing for a more accurate tape alignment and tracking.

It is an object of the present invention to provide a means for cleaning magnetic tape as it moves through a magnetic tape transport system.

It is a further object of the present invention to provide a means for reducing wear to the read/write head in a magnetic tape transport system.

It is yet a further object of the present invention to provide a means for reducing the wear to the tape itself in a magnetic tape transport system.

It is still yet another object of the present invention to provide a means for combining the function of a tape cleaner and a rewind tape foot into a single unit.

And it is still yet a further object of the present invention to provide a means for improving the alignment of the tape with respect to the read/write head as the tape moves in a tape transport system.

SUMMARY OF THE INVENTION

In the preferred embodiment of the present invention, the tape cleaner/rewind foot is deposed adjacent to the tape path between the read/write head and one of the tape guides, such that the oxide side of the tape moving in the tape transport system is in contact with the cleaning screen attached to the bottom side of the cleaning head (prior to the tape passing the read/write head). A plurality of relatively small holes in the cleaning screen loosen the foreign matter on the tape. This foreign matter is then removed by a suction means, that is, by use of negative pressure inside a cavity located in the cleaning head and communicating with the cleaning screen. The cleaning head cavity is in communication with a negative pressure means. The negative pressure pulls the loosened matter from the tape, through the holes in the screen, and ultimately out of the system.

The tape foot is a hollow, rectangular shaped, member rotatably mounted around the cleaning head such that, when the system is in the read/write mode, the foot is in an up-position out of the tape path. However, when the system is in the rapid rewind mode, a rotating means is activated and rotates the foot downward to cover the cleaning head and lift the tape away from the read/write head. As the tape approaches full rewind speed, the aerodynamic shape of the face of the foot creates hydrodynamic pressure which lifts the tape off the face of the foot. When rewind is stopped, the foot is rotated upward and the tape once again engages the tape cleaning screen on the cleaning head.

Placing both the tape cleaner and the tape foot in a single unit allows the tape guide to be located closer to the read/write head thereby providing for enhanced alignment of the tape with respect to the read/write head.

DETAILED DESCRIPTION OF THE PREFERRED EMBODIMENT

Figure 1:
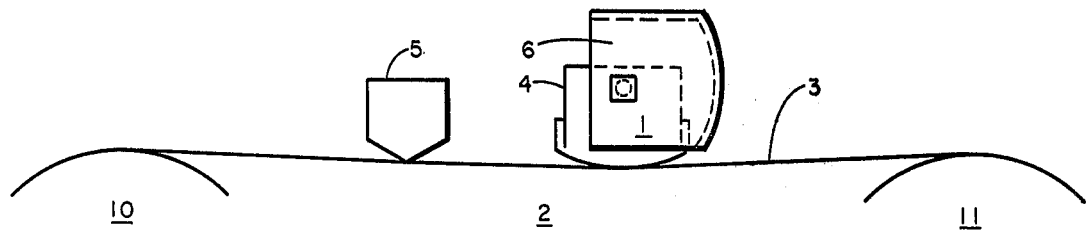
FIG. 1 is a schematic representation of the disclosed invention mounted in a magnetic tape transport system which is operating in the read/write mode.

FIG. 1 shows the tape cleaner/rewind foot assembly 1 with the tape transport system 2 in the read/write mode. The oxide surface of the tape 3 is in contact with the bottom side of the cleaning head 4, and the read/write head 5. In the read/write mode, the rewind foot 6 is in an up position out of the path.

Figure 2:
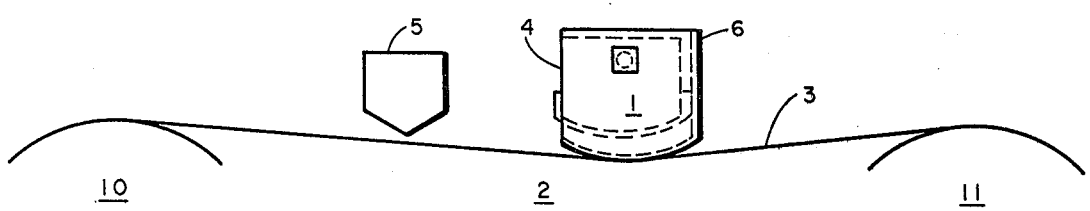
FIG. 2 is a schematic representation of the disclosed invention when the tape transport system is in the rapid rewind mode.
Figure 3:
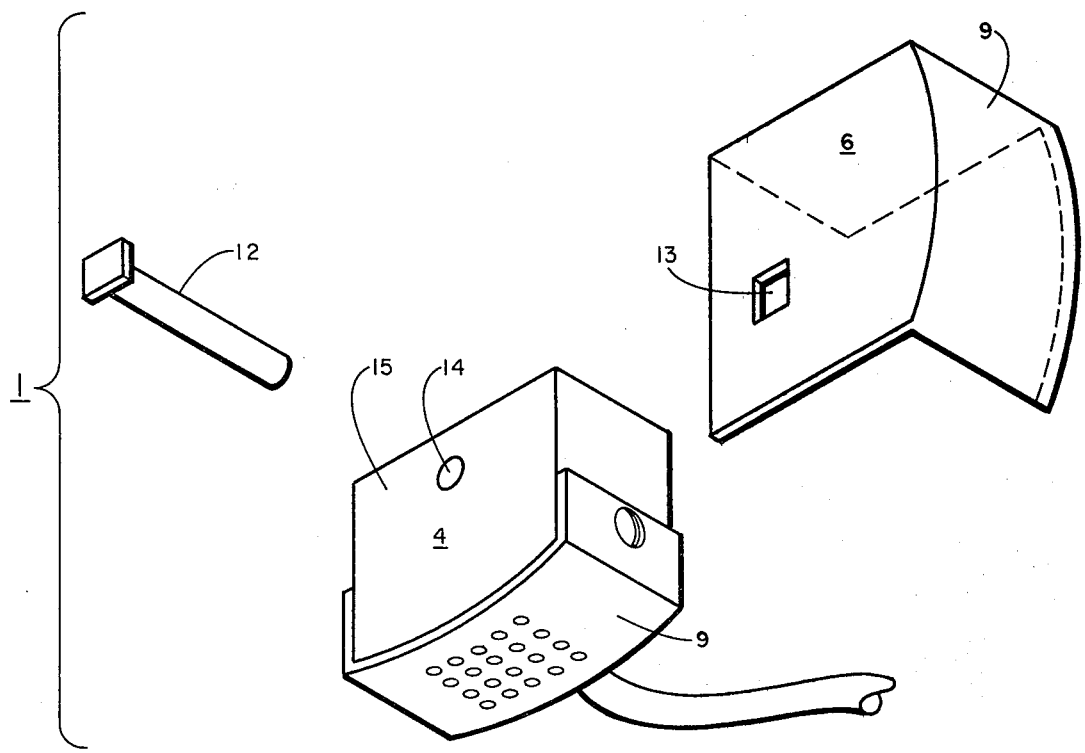
FIG. 3 is a perspective view detailing the attachment of the rewind foot to the tape cleaner.
Figure 4:
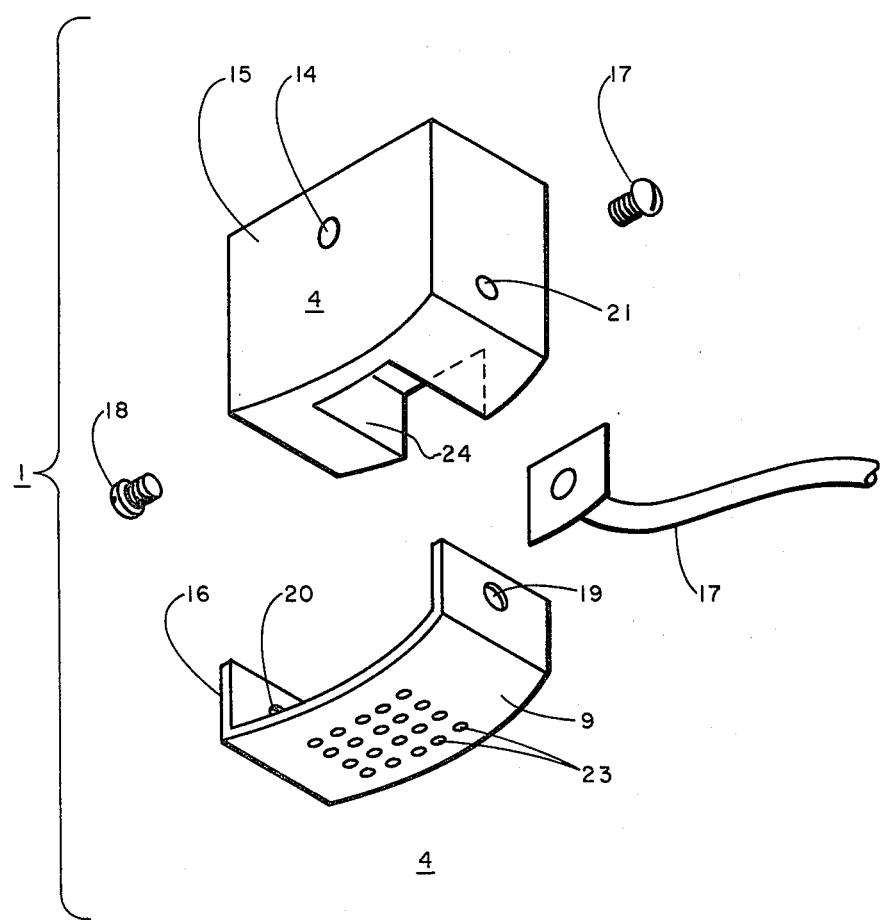
FIG. 4 is a perspective view of the dissassembled cleaning head portion of the disclosed invention.

FIG. 2 shows the cleaner/foot assembly 1 with the transport system 2 in a rapid rewind mode. In this mode, the rewind foot 6 has been rotated downward and is deposed in the tape path, covering the cleaning head 4 and lifting the tape away from the read/write head 5. As shown in FIGS. 3 and 4, the bearing surface 9 of the rewind foot 6 is a curved surface with a design radius such that when the system 2 approaches full rewind speed, the bearing surface 9 acts as a hydrodynamic bearing surface causing the tape 3 to float slightly away from the tape foot 6. As shown in FIG. 2, design of the guide bearings 10 and 11 as hydrodynamic bearings can allow the tape 3 to move through the system 2 without contacting and sliding over a bearing surface during the rapid rewind mode of opration, resulting in significantly reduced tape wear.

As shown in FIG. 3, the rewind foot 6 is rotatably mounted on the cleaner head 4 by means of a shaft 12 engaging a hole 13 in the tape foot 6. The shaft 12 passes through a passage 14 for that purpose in the cleaning head 4 and is ultimately attached, by any conventional means, to a means for rotating, such as a linear solenoid with connecting linkage (not shown), which is activated when the system 2 is engaged in the rapid rewind mode. When the system is in the read/write mode, the conventional rotating means can rotate the shaft 12, and thereby the foot 6, out of the tape path, exposing the cleaning head 4.

As shown in FIG. 4, the cleaning head is comprised of a cleaning block 15, a cleaning screen 16, and a negative pressure means 17. The screen 16 is attached to the block 15 with two threaded screws 17 and 18 through holes 19 and 20 in the screen and threaded holes 21 and 22 (not shown in FIGS. 3 and 4) in the block.

As the tape passes over the cleaning screen 9, the cleaning screen holes 23 gently contact the foreign matter on the tape 3, loosening said foreign matter. When assembled, the cleaning screen holes 23, communicate with the cavity 24 in the cleaning block 15 and the negative pressure means 17, such that when loosened material on the tape 3 passes under a cleaning screen hole 23, the negative pressure will lift the foreign material off the tape, through the hole 23, through the cavity 24 and out of the system 2 through the negative pressure means 17.

We claim:

1. A single-unit means for cleaning the magnetizable surface of magnetic recording tape during the read/write operation, and for lifting said tape away from the read/write head and cleaning means during rewind operation, comprising:
    a means for loosening the foreign matter on the surface of the magnetic tape as the tape moves past said means during the read/write operation;
    a means for lifting the tape away from the read/write head and the foreign matter removing means during rewind operation, said lifting means rotatably mounted around the foreign matter removing means;
    a means for selectively rotating the lifting means into and out of the tape path; and
    a means for removing the loosened particles from the tape transport system.

2. A single-unit cleaning and lifting means as recited in claim 1, wherein the means for loosening the foreign matter on the tape is comprised of:
    a cleaning block, having an interior cavity, a means for attaching a cleaning screen such that the screen is in communication with the cleaning block interior cavity, and a means for connecting the cavity interior with a negative pressure means; and
    a cleaning screen, having a plurality of relatively small diameter holes.

3. A single-unit cleaning and lifting means as recited in claim 2 wherein the means for lifting the tape away from the read/write head and the cleaning block is comprised of a hollow, rectangular-shaped rewind foot, having a hydrodynamically shaped bottom, and an open back, top, and side, so as to allow the rewind foot to rotate down around the cleaning block and into the tape path.

4. A single-unit apparatus for cleaning the magnetizable surface of magnetic recording tape during the read/write operation, and for lifting said tape away from the read/write head and cleaning means during rewind operation, comprising:
    a means for loosening the foreign matter on the surface of the magnetic tape as the tape moves past said means during the read/write operation;
    a means for lifting the tape away from the read/write head and the foreign matter removing means during rewind operation, said lifting means rotatably mounted around the foreign matter removing means;
    a means for selectively placing the lifting means into and out of the tape path; and
    a means for removing the loosened particles from the tape transport system.

5. A single-unit cleaning and lifting apparatus as recited in claim 4, wherein the means for loosening the foreign matter on the tape is comprised of:
    a cleaning head, having an interior cavity, an apparatus for attaching a cleaning screen such that the screen is in communication with the cleaning block interior cavity, and a means for connecting the cavity interior with a negative pressure means; and
    a cleaning screen, having a plurality of relatively small diameter holes.

6. A single-unit cleaning and lifting apparatus as recited in claim 5 wherein the apparatus for lifting the tape away from the read/write head and the cleaning block is comprised of a hollow, rectangular-shaped rewind foot, having a hydrodynamically shaped bottom, and an open back, top, and side so as to allow the rewind foot to rotate down around the cleaning block and into the tape path.

7. An improved tape transport system having a read/write head, a plurality of tape guide bearings, a tape cleaning means and a rewind foot, wherein the improvement comprises:

a means for loosening the foreign matter on the surface of the magnetic tape as the tape moves past said means during the read/write operation;

a means for lifting the tape away from the read/write head and the foreign matter removing means during rewind operation, said lifting means rotatably mounted around the foreign matter removing means;

a means for selectively rotating the lifting means into and out of the tape path; and a means for removing the loosened particles from the tape transport system, such that the distance between the read/write head and the tape guides is reduced thereby improving the alignment of the tape as it passes over the read/write head.

8. An improved tape transport system as recited in claim 7, wherein the means for loosening foreign matter on the tape is comprised of:

a cleaning block, having an interior cavity, a means for attaching a cleaning screen such that the screen is in communication with the cleaning block interior cavity, and a means for connecting the cavity interior with a negative pressure means; and a cleaning screen, having a plurality of relatively small diameter holes.

9. An improved tape transport system as recited in claim 8, wherein the means for lifting the tape away from the read/write head and the cleaning block is comprised of a hollow, rectangular-shaped rewind foot, having a hydrodynamically shaped bottom, and an open, back and top side so as to allow the rewind foot to rotate down around the cleaning block and into the tape path.

* * * * *